Sept. 20, 1932.  M. M. AUSTIN  1,878,095
PRESSURE WELDING ELECTRODE
Filed Jan. 17, 1929
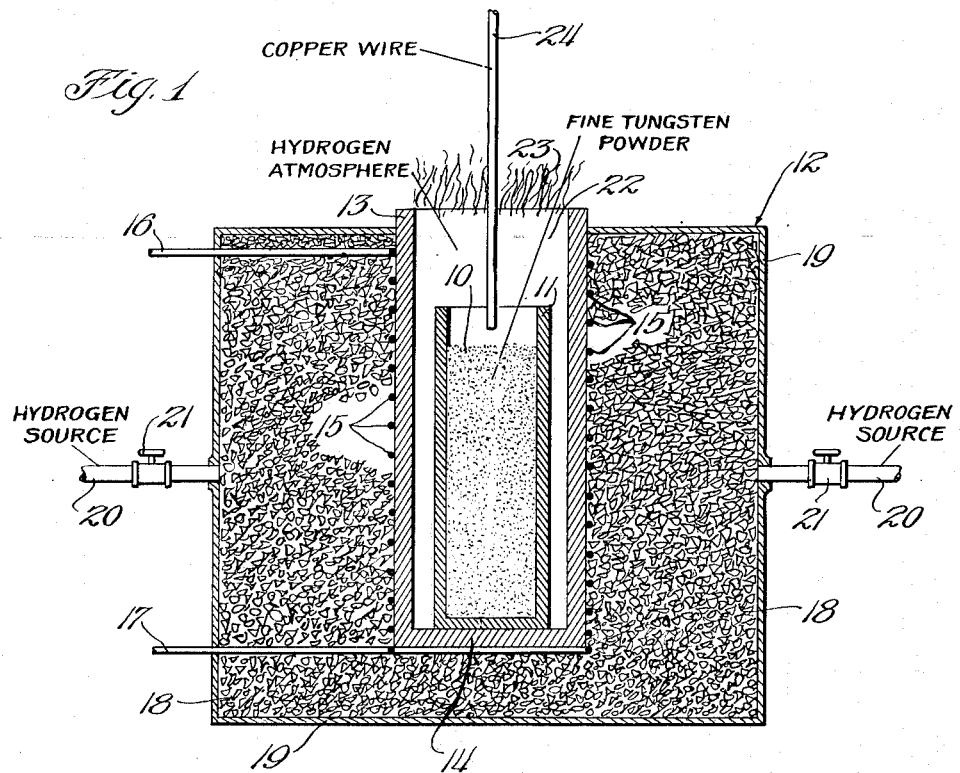
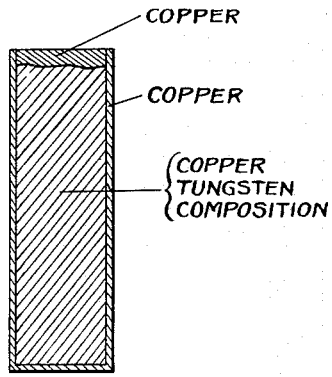
Inventor:
Miner M. Austin
By Williams, Bradbury, McCaleb & Hinkle
Attys.

Patented Sept. 20, 1932

1,878,095

UNITED STATES PATENT OFFICE

MINER M. AUSTIN, OF WAUKEGAN, ILLINOIS, ASSIGNOR TO FANSTEEL PRODUCTS COMPANY, INC., OF NORTH CHICAGO, ILLINOIS, A CORPORATION OF NEW YORK

PRESSURE WELDING ELECTRODE

Application filed January 17, 1929. Serial No. 333,044.

My invention relates to a welding electrode which must withstand high temperatures and high pressures without deformation, and it pertains more particularly to a copper tungsten electrode of this type.

An object of my invention is to provide an improved electrode which utilizes the conductivity of a metal like copper with the physical and chemical properties of refractory metals like tungsten and molybdenum to yield an electrode which will withstand high pressures and temperatures without deformation, which will not stick to the work, which will not corrode, which will have greater hardness than electrodes heretofore used, and which will have a longer life.

A further object is to provide an improved process for making electrodes of this type.

A further object is to provide a composition of matter consisting of compacted tungsten particles, all of the voids between said particles being filled with the metallic copper.

A further object is to provide a process for making electrodes of this type which will avoid the necessity of using high pressures and which avoids the step of sintering.

A further object is to avoid sintering and intermolecular reactions thereby preserving extremely finely divided tungsten particles in the finished product, thus obtaining greater resulting hardness for a given tungsten content.

Other objects will be apparent as the detailed description of my invention proceeds.

My invention may be briefly characterized as follows:

Chemically pure tungsten powder is tamped in a graphite crucible, the crucible is inserted in an electric furnace surrounded by an atmosphere of hydrogen, the temperature is raised to a point slightly above the melting point of copper, and copper wire is slowly and gradually fed into the compacted tungsten mass so that copper is gradually absorbed and drawn into the mass of tungsten particles due to the effect of gravity, capillary attraction and surface tension.

I have discovered that when extremely finely divided tungsten powder is saturated with copper in the manner described an electrode is produced which combines the strength, rigidity and refractory properties of tungsten with the conductivity of copper. I believe that the product is a mixture of copper and tungsten and that there is no chemical reaction or solution such as takes place, for instance, when copper and aluminum are treated in this manner. Apparently each metal maintains its own identity and is in the final electrode as such.

The copper is materially hardened by this treatment, however, and I believe that the hardness is increased with the decrease in the size of tungsten particles. The failure of copper under compression is due to the sliding of copper molecules which are apparently in parallel planes. By introducing particles of tungsten in the mass of copper this sliding is prevented, especially when the tungsten particles are of microscopic size.

If large particles of tungsten are used in this electrode the tungsten particles must be sintered or fritted together to give the necessary strength because otherwise copper will slide around the particles. When microscopic particles of tungsten are used for this purpose they fit in the interstices of the copper so that the electrode is essentially a matrix of copper stiffened by finely divided particles of tungsten, the function of which is to prevent the copper molecules from sliding over each other.

Tungsten is a fairly good conductor and, as above pointed out, tungsten does not lower the conductivity of copper in my improved electrode, but supplements it.

In the accompanying drawing in which I have shown a preferred embodiment of my invention and in which similar parts are represented by like reference characters, Fig. 1 is a diagrammatic section through my furnace showing the means for supplying copper to the heated tungsten powder; and Fig. 2 is a section of my welding electrode composition as it is removed from the crucible.

Finely divided tungsten powder 10 is prepared by reducing chemically pure tungsten oxide with hydrogen, and it is essential that the tungsten be free from impurities and that it be in extremely finely divided form, each particle being in reality a plurality of particles of sub-miscroscopic dimensions.

Finely divided tungsten powder prepared in this manner is poured into a graphite crucible 11 and compacted by shaking it or by manually tamping it with a pestle.

The graphite crucible 11 may be of any size or shape, and it is preferably formed to the shape of the finished product to minimize the necessity for working or tooling.

While I have described a graphite crucible, it is understood that this is illustrative only and that any suitable inert material which will withstand the working temperature may be utilized for this purpose.

The crucible 11 is inserted in an electric furnace 12 which may be briefly described as a porous alundum cylinder 13 with an alundum disc 14 for the bottom. This refractory cylinder is surrounded by resistance coils of molybdenum wire 15 connected to power supply by conductors 16 and 17. The transformer and means for regulating the current form no part of the present invention and are not, therefore, shown in the drawing.

The molybdenum wound alundum cylinder is inserted in magnesia 18 or other refractory powder contained in a cast iron box 19. It is understood that all of these materials are illustrative only and per se they form no part of my invention.

Hydrogen is admitted to the furnace through pipes 20 and regulating valves 21, the gas being introduced into the refractory powder 18 and diffused through the alundum cylinder 13 into the interior 22 of the furnace. During the operation of this furnace the hydrogen burns at the top in a pale blue flame 23.

The powder is poured into the graphite crucible and tamped the desired amount (the density and hardness of the final product is somewhat dependent upon the amount of tamping). When the temperature of the tungsten powder reaches a point slightly above the melting point of copper, a wire 24 of chemically pure electrolytic copper is applied to the surface of the tungsten mass where it melts and soaks into the powder like water would soak into sand, wetting all of the particles and filling all the voids between them. The copper is added until an excess remains at the surface, after which the mixture is allowed to cool.

The resulting material may be easily removed from the graphite mold because the copper tungsten electrode shrinks slightly on cooling. This is due to the effect of the copper on the tungsten because if no copper were added the tungsten would not shrink and could not be removed from the mold. The copper not only causes sufficient shrinkage to remove the electrode from the crucible, but it causes such a shrinkage that a thin layer of copper is formed on all sides of the electrode, as shown in Fig. 2. This copper surface can be easily removed by machining before the electrode is subjected to use.

The percent of copper and tungsten will depend upon the degree to which the tungsten particles are compacted. In no case is great pressure required, and great pressure is, in fact, detrimental because it tends to create large particles of tungsten and to prevent the copper from penetrating throughout the mass. Ordinarily I compact the powder by gently tamping it with a pestle so that the voids are filled with about 35% copper by weight (which would be considerably more than half by volume).

While I have described a welding electrode in which tungsten powder is saturated with copper, or, in other words, in which the copper is hardened by microscopic particles of tungsten, it is understood that this is only illustrative. I have found the molybdenum gives very satisfactory electrodes, and, in fact, any other good conductor may be used which can be obtained in finely divided powder suitable for my purpose. Chromium is admirable because of its high conductivity, the only difficulty being the step of preparing the finely divided pure chromium powder.

Copper is illustrative only, as I contemplate that silver and other conductors may be used, as will be apparent to any one skilled in the art.

Attention is particularly directed to the fact that I avoid the use of high pressures and high temperatures throughout the whole process.

The temperature has been defined as slightly above the melting point of copper. It is usually between 1150 degrees and 1200 degrees C., the lower temperatures being satisfactory when the powder is sufficiently fine.

The theory which I have set forth to explain the phenomenal effect of finely divided tungsten on copper is given merely to aid in the understanding of my invention, but I do not limit myself to this or any other theory, my process being clearly defined by the physical steps described.

While I have described a preferred embodiment of my invention, it is understood that I am not limited to the details therein set forth except as defined by the following claims.

I claim:

1. A welding electrode comprising in the final composition from 25% to 45% by weight of copper and microscopic tungsten particles making up the remainder and dispersed throughout the copper to prevent intermolecular slippage of the copper.

2. A welding electrode of tungsten and copper in which the tungsten is in the form of finely divided particles making up at least 65% by weight of the electrode.

3. A welding electrode of unsintered tungsten and copper in which the copper makes up from 25 to 45% of the whole and the tungsten is in the form of slip-interfering particles dispersed throughout the copper.

In witness whereof, I hereunto subscribe my name this 14th day of January, 1929.

MINER M. AUSTIN.